(12) United States Patent
Ferraro et al.

(10) Patent No.: US 9,989,401 B2
(45) Date of Patent: Jun. 5, 2018

(54) METHOD AND APPARATUS FOR ORIENTING A MEASURING DEVICE

(75) Inventors: Franco Ferraro, Schworstadt (DE); Harald Faber, Lorrach (DE); Steffen Markoni, Rheinfelden (DE)

(73) Assignee: ENDRESS + HAUSER GMBH + CO. KG, Maulburg (DE)

(*) Notice: Subject to any disclaimer, the term of this patent is extended or adjusted under 35 U.S.C. 154(b) by 839 days.

(21) Appl. No.: 13/976,604

(22) PCT Filed: Dec. 1, 2011

(86) PCT No.: PCT/EP2011/071465
§ 371 (c)(1),
(2), (4) Date: Jun. 27, 2013

(87) PCT Pub. No.: WO2012/089438
PCT Pub. Date: Jul. 5, 2012

(65) Prior Publication Data
US 2013/0269414 A1 Oct. 17, 2013

(30) Foreign Application Priority Data

Dec. 30, 2010 (DE) .......................... 10 2010 064 394

(51) Int. Cl.
*G01F 23/28* (2006.01)
*G01F 25/00* (2006.01)
(Continued)

(52) U.S. Cl.
CPC .......... *G01F 25/0084* (2013.01); *G01F 23/00* (2013.01); *G01F 23/284* (2013.01);
(Continued)

(58) Field of Classification Search
CPC ............ G01F 25/0061; G01F 25/0084; G01F 25/0069; G01F 23/2968; G01S 13/08
(Continued)

(56) References Cited

U.S. PATENT DOCUMENTS 5,184,510 A * 2/1993 Rossman ............ G01F 23/0076
73/1.73
6,601,000 B1 7/2003 Barlian et al.
(Continued)

FOREIGN PATENT DOCUMENTS

| DE | 102004041857 A1 * | 3/2006 |
| JP | 2004205147 A | 7/2004 |
| JP | 2009139212 A | 6/2009 |

OTHER PUBLICATIONS

Machine translation of DE102004041857.*
(Continued)

*Primary Examiner* — David A Rogers
(74) *Attorney, Agent, or Firm* — Bacon & Thomas, PLLC

(57) ABSTRACT

A measuring device featuring ascertaining and monitoring optimized orientation of the measuring device. Thus, the invention provides a measuring device for determining and/or monitoring limit level or fill level of a medium in a container, comprising at least one sensor unit and a measurement transmitter unit, wherein at least one inclination sensor is integrated in the measuring device for ascertaining orientation of the measuring device and/or the sensor unit on the container.

8 Claims, 2 Drawing Sheets

(51) Int. Cl.
  *G01F 23/284* (2006.01)
  *G01F 23/00* (2006.01)
  *G01F 23/296* (2006.01)
(52) U.S. Cl.
  CPC ...... *G01F 23/2962* (2013.01); *G01F 23/2967* (2013.01); *G01F 25/0061* (2013.01)
(58) Field of Classification Search
  USPC .......................................................... 73/1.73
  See application file for complete search history.

(56) References Cited

U.S. PATENT DOCUMENTS

| | | | | |
|---|---|---|---|---|
| 6,634,234 | B1* | 10/2003 | Haas | 73/618 |
| 7,552,634 | B2* | 6/2009 | Huber | G01F 23/003 73/290 V |
| 7,614,299 | B2* | 11/2009 | Birner | G01F 1/86 73/290 B |
| 2006/0201245 | A1* | 9/2006 | Huber | G01F 23/003 73/290 R |
| 2008/0100501 | A1 | 5/2008 | Edvardsson | |
| 2009/0019929 | A1 | 1/2009 | Kingdon | |
| 2009/0095070 | A1* | 4/2009 | Battefeld | B01D 21/30 73/290 V |
| 2010/0182190 | A1* | 7/2010 | Spanke et al. | 342/124 |
| 2012/0174420 | A1* | 7/2012 | Neubauer et al. | 33/301 |
| 2013/0269414 | A1* | 10/2013 | Ferraro | G01F 23/284 73/1.73 |

OTHER PUBLICATIONS

Machine translation of DE 102004041857 A1 which originally published on Mar. 2, 2006.*
German Search Report in corresponding German Application No. 10 2010 064 394.7 dated Sep. 5, 2011.
International Search Report in corresponding International Application No. PCT/EP2011/071465 dated Feb. 24, 2012.
English translation of International Preliminary Examination Report dated Jul. 11, 2013.

* cited by examiner

METHOD AND APPARATUS FOR ORIENTING A MEASURING DEVICE

TECHNICAL FIELD

The present invention relates to a measuring device for determining and/or monitoring limit level or fill level of a medium in a container. The measuring device includes at least one sensor unit and a measurement transmitter unit.

BACKGROUND DISCUSSION

Also produced and sold by Endress+Hauser are measuring devices under the marks MICROPILOT and PROSONIC, which work according to the travel-time, measuring method and serve to determine and/or to monitor fill level of a medium in a container. In the travel-time, measuring method, for example, ultrasonic waves are transmitted via a sound transducer, or microwaves, or radar waves, are transmitted via an antenna and echo waves reflected on the surface of the medium are received back after a distance dependent travel time of the signal. From the travel time with the assistance of known propagation velocity, the fill level of the medium in a container can be calculated. The echo curve represents, in such case, the received signal amplitude as a function of time, or travel distance, wherein each measured value of the echo curve corresponds to the amplitude of a measurement signal reflected on a surface at a certain distance away.

Because the measuring method uses the reflection principle, the quality of the measurement signal, or of the echo curve, depends, in the case of measuring devices, which work according to the travel-time, measuring method, strongly on the installed position. For example:
- the reflection characteristics of the medium;
- structurally related disturbance elements in the radiation lobe of the transmission element;
- bulk-good cone formation;
- filling apparatuses and stirring mechanisms in the container; and
- accretion formation of the medium on the sensor unit have a strong influence on the reliability and availability of measuring devices and on the measured values ascertained by them. The effects of these influencing factors on the measurement signal can be minimized by optimized installation of the sensor unit. In the case of the travel-time, measuring method (also called the "time of flight" measuring method), such as e.g. freely radiating microwave, measurements technology and ultrasound, measurements technology, it is important for optimal measuring performance to optimize the measuring situation with the assistance of the installed position of the antenna, respectively, the installed position of the sound transducer.

In today's state of the art, for optimal orienting of the antenna, or of the sound transducer, operating personnel must step-wise change the position of the sensor unit and observe a characteristic variable appearing on a display (e.g. intensity of the amplitude of the fill-level echo in dB) for the respectively set antenna, or sound transducer, position, in order to be able to evaluate the measuring situation in the container, e.g. a tank. However, the known characteristic variable provides no comprehensive information concerning the orientation, or installed situation, of an antenna, or of a sound transducer, in a container. Most often, only the intensity of the amplitude of the fill-level echo can be taken into consideration.

Furthermore, it is, in today's state of the art, possible to represent the echo function as a function of time on the display of the measuring device or on a networked service tool, and, thus, to ascertain the current measuring situation for the current position of the sensor unit. Such an apparatus for visualizing an echo curve or historical data on a display unit is known from German published patent application DE 100 52 836 A1. The disadvantage of this apparatus is that it is not possible to compare the measuring signals visually with one another for different installation situations of the measuring device and the representation is very slow due to the large amounts of data.

An apparatus for modifying the installed position using a mechanical orienting apparatus of a fill-level measuring device is known from German published patent application DE 101 06 176 A1. Furthermore, an apparatus for changing the radiation characteristic of a planar antenna is known from German published patent application DE 101 49 851 A1. An apparatus for detecting a defective, installed situation of a flow measuring device in a measurement structure is known from German published patent application DE 102 30 607 A1. In this published application (Offenlegungsschrift), an apparatus is presented, which detects a defective installed situation of a vortex, flow measuring system and sends a corresponding error report to a control system. The disadvantage of these examples of an orienting apparatus is that operating personnel need a large amount of technical knowledge, or know how, in order to adjust or orient the measuring device.

Furthermore, the assignee produces and sells measuring devices under the marks LIQUIPHANT AND SOLIPHANT, which follow the limit-level of a medium in a container by means of change of vibratory behavior of an oscillatory element, especially an oscillatory fork.

Known in the state of the art for determining limit level, respectively fill level, and other process variables of a medium are so called oscillatory forks (e.g. European Patent, EP 0 444 173 B1), single rods (e.g. published international application, WO 2004/094964 A1) or also membrane oscillators as oscillatory elements. Used in the case of the respective measurements is the fact that the parameters of the mechanical oscillations (oscillation amplitude, resonant frequency, phase difference versus frequency) of the oscillatable unit depend on contact with the medium and also on the properties of the medium. Thus, for example, frequency or amplitude of the oscillations decreases, especially when the liquid medium reaches and at least partially covers the oscillatable unit. The liquid medium acts on the oscillating body of the sensor—i.e. e.g. the oscillatory fork, or the single rod, or the membrane—, on the one hand, as mass which is dragged along, so that the oscillation frequency sinks, and, on the other hand, as a mechanical damper, so that the oscillation amplitude decreases. Therefore, from the decrease of the oscillation frequency, or the amplitude, it can be deduced that the medium has reached a fill level dependent on the embodiment and the position of mounting of the apparatus. Furthermore, the oscillation frequency is also dependent, for example, on the viscosity of the medium (see e.g. European Patent EP 1 325 301).

For exciting the respective mechanically oscillatable units, piezoelectric elements are often used, which, conversely, also convert the mechanical oscillations into electrical signals. Furthermore, for certain applications, also an electromagnetic excitation of the oscillatable unit is possible.

In the state of the art, there are approaches for designing the sensor units to self-monitoring, i.e. for testing whether the sensor, or individual components of the sensor, is/are capable of working properly. A problem, in such case, is that especially the functional ability of the oscillatable unit, i.e. the component, which comes in contact with the medium and, thus, is exposed to the largest loadings, is not checked in the known measuring methods. However, for exact measuring, it is necessary to assure the installed position of the sensor unit.

SUMMARY OF THE INVENTION

An object of the invention is to provide a measuring device featuring ascertaining and monitoring optimized orientation of the measuring device.

This object is achieved by an apparatus measuring device for determining and/or monitoring limit level or fill level of a medium in a container, comprising: at least one sensor unit; and a measurement transmitter unit, and at least an inclination sensor, wherein: said at least one inclination sensor is integrated in the measuring device for ascertaining orientation of the measuring device and/or said at least one sensor unit on the container.

BRIEF DESCRIPTION OF THE DRAWINGS

The invention will now be explained in greater detail based on the figures of the appended drawing. For simplification, identical parts are provided in the figures with equal reference characters. The figures of the drawing show as follows.

DETAILED DISCUSSION IN CONJUNCTION WITH THE DRAWINGS

Figure 1:
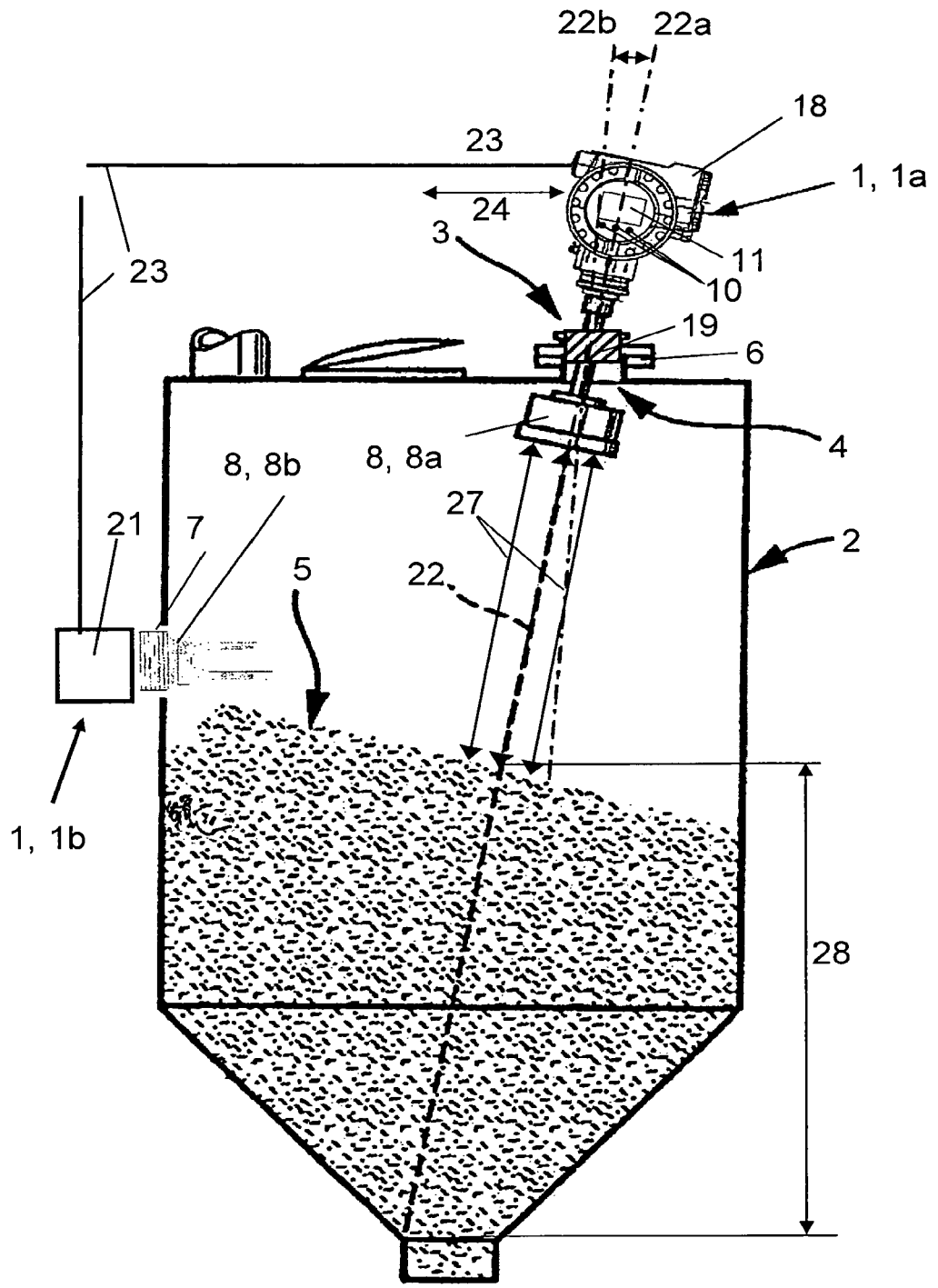
FIG. 1 is an example of an embodiment of the measuring device of the invention mounted on a container.

FIG. 1 shows, mounted in a nozzle 4 on a container 2, a measuring device 1a using the travel-time, measuring method to ascertain fill level 28 of a medium 5, or fill substance 5, in the container 2.

Measuring device 1, 1a is in most applications secured via a flange 6 in a nozzle 4 on the container 2. There is, however, also the opportunity to secure a measuring device 1, 1b by screwing it into a threaded opening 7 into the container 2. FIG. 1 shows the option of a mechanical orienting of the sensor unit 8 via a mechanical orienting apparatus 3, such as a pressure- and gas tight, ball joint. However, also other orienting apparatuses 3, such as e.g. rotary, or rotating, wedge, flange assembly, etc. can be used as orienting apparatus 3.

Shown in FIG. 1 is a measuring device 1, which is basically composed of a sensor unit 8, which is located in the container 2, and a measurement transmitter unit 21, which is located in a housing outside of the closed container 2. Sensor unit 8, here especially a sound transducer 8a, is introduced in the container 2 via a nozzle 4 and secured on the container 2 using a "both sides" flange 6. "Both sides" refers to the fact that the flange has provision for applying pressure to both sides of the ball of the ball joint, to retain an orientation, following rotation to the orientation. A mechanical orienting apparatus 3 is provided in the region, in which the measuring device 1a is secured on the container 2. The mechanical orienting apparatus 3 can be optionally automatically tilted into different orientations via a drive 19, in which case an option is that an orientation can be retained simply by means of the drive itself. The measuring device 1a has a power supply line 24 and is connected to a fieldbus 23. Integrated in the measurement transmitter unit 21 is an inclination, or tilt, sensor 14, which ascertains an orientation measured value 15. These ascertained, orientation measured values 15 are represented visually or acoustically at the display unit 9 of the measuring device 1, 1a, 1b. Input unit 10 enables interaction with the measuring device 1, 1a, 1b.

The measuring device 1, 1a, 1b, respectively the sensor unit 8, is moved with the mechanical orienting apparatus 3 via a drive 19 from a first installed position 22a into a second installed position 22b. The change of the inclination of the measuring device 1 is ascertained via the integrated inclination sensor 14 and visually presented as orientation measured value 15, for example, on a display, such as display unit 9. Furthermore, an option is that the orientation of the measuring device 1, 1a, 1b can be signaled to the operator based on the tone level of an acoustic tone signal from the display unit 9. In the case of this embodiment, it is necessary that a tone emitter be present in the display unit 9.

Energy supply to the measuring device 1 occurs via a supply line 24, and communication with a remote, control station or with other measuring devices 1 is achieved via a fieldbus 23, via any of the known communications standards, such as e.g. PROFIBUS—PA or FOUNDATION FIELDBUS. Especially, an option is to supply the measuring device 1 via a fieldbus 23 with the needed energy. For this, the measuring device 1 is preferably designed according to the standard and specifications of a 4-20 mA, two conductor, measuring device. Through the communications link of the startup device 8, respectively the measuring device 1, via the fieldbus 23 to a remote control station, also an automated orienting procedure of the measuring device 1 started and evaluated from the control station provides another option.

The manner in which the fill level measuring device 1a functions will now be described as follows. Transmitted from the measuring device 1, respectively the sensor unit 8, into the measurement space, respectively into the container 2, is a broadband microwave or ultrasound, pulse signal. On surfaces of objects, e.g. disturbance elements, or fill substance 5, located in the radiation cone of the sensor unit 8, the waves are reflected back according to the law of reflection at an equal angle measured with respect to the normal to the surface. In this way, on each surface lying in the radiation lobe of the sensor unit 8, dependent on the angle of incidence and on the material of the reflector, a reflection signal is reflected back into the sensor unit 8. From the travel time of the measurement signal reflected back from the surface of the fill substance 5, the fill level 21 of the fill substance 5 is calculated. The orienting of the sensor unit 8 of a fill-level measuring device 1a is, moreover, also necessary in the case of the FMCW—method and is also performed in that case.

Via a selection function in the user interface of the measuring device 1 or upon initial start-up, the measuring device 1 switches into an operating mode, in which the orienting of the sensor unit 8 can be performed.

Figure 2:
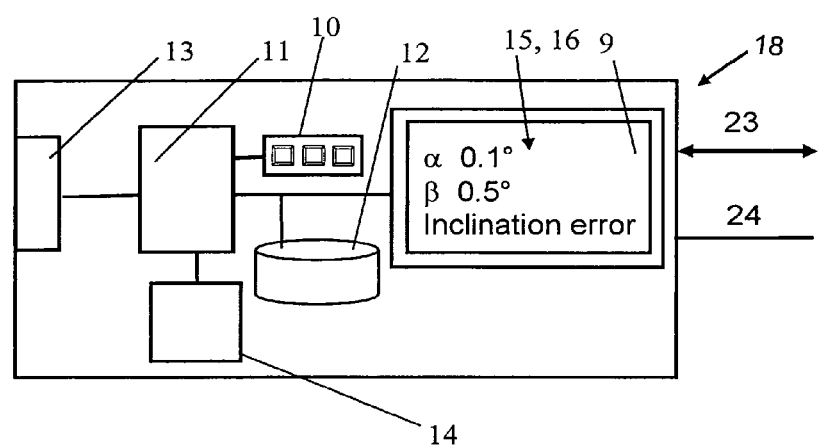
FIG. 2 is an example of an embodiment of the measurement transmitter unit of the invention for the measuring device of the invention.

FIG. 2 schematically illustrates the startup mode of the measuring device 1, 1a, 1b. The measuring device 1, 1a, 1b includes, for example, a display unit 9, via which the orientation measured value 15 or, in given cases, error reports 16 is/are displayed and an input unit 10 for interacting with the measuring device 1, 1a, 1b and with the control station connected via the communication unit 13. The orientation measured values 15 of the inclination sensor 14 are processed in the data processing unit 11 and stored in the memory unit 12. The measuring device 1, 1a, 1b communicates via the data interface, via the data bus 23 with other measuring devices 1 and the control station. Communication between the measuring device 1, 1a, 1b and the control station can likewise occur via the energy supply of the measuring device 1, 1a, 1b via the same data line in two conductor or four conductor technology. An option is, moreover, wireless communication via radio. The display unit 9, the input unit 10, the data processing unit 11, the position sensor 14 and/or the memory unit 12 can be located either in the sensor unit 8 or in the measurement transmitter unit 21 of the measuring device 1, or they can be integrated simultaneously in both.

A basic ingredient for obtaining high accuracy of measurement is a correspondingly high signal to noise ratio, which is achieved in the case of sensor unit 8 in the form of a radar antenna by a high antenna gain. An associated part of this is always a corresponding beam focusing, in order that disturbance elements, such as e.g. the tank wall, are not registered by the radiation lobe. For example, the aperture angle in the case of a parabolic antenna at 26 GHz amounts to about 5°. A large disadvantage of these strongly focusing antennas as sensor unit 8 is their high sensitivity relative to their orientation with respect to the surface of the medium 5. Only few degrees deviation from perpendicular can lead to considerable signal losses.

As already described, alternatively, the sensor unit 8 in the form of an antenna can also be oriented based on obtaining maximum signal amplitude. In such case, however, data transmission to the service tools is too slow and the reaction to an inclination change so strongly delayed that this adjustment opportunity is not practically useful.

Future RADAR fill level measuring devices 1,1a will probably work with frequencies up to 80 GHz, whereby yet greater focusing of the radiation profile of the antenna will be achieved. However, in such case, exact orienting of the measuring device 1, 1a will definitely be necessary, in order to prevent disturbing influences.

The inclination sensor 14 can, moreover, also monitor orientation of the measuring device 1 while the measuring device 1 is operating and detect whether the measuring device 1 is not oriented exactly, in order to assure highly accurate measuring. Causes for an inclination change of the measuring device 1 can include, for example, weathering resulting from wind and snow. Even construction activities at the plant can lead to an inclination change of the measuring device 1.

The inclination sensor 14 can be, for example, a 3-axis inclinometer installed at any location in or on the measuring device 1. Preferably, the inclinometer is installed on a circuit board in the measurement transmitter unit 18. The measuring device 1 must then be brought once into the right position, i.e. into the perpendicular position, in order to register the values of the inclination sensor 14 and to store such as orientation measured value 15 in a memory unit 12. Electronic levels, respectively inclination sensors, 14, respectively inclinometers are produced as micro-mechanical components (MEMS) and can be processed in the same way as other electronic components.

The monitoring of the orientation of the measuring device 1, 1a, 1b includes that the measurement transmitter unit 18 has a memory unit 12, in which limit values for the orientation measured value 15 are stored, and that the measuring device 1, in the case of an ascertained orientation measured value 15 outside of the range of these limit values, outputs an error report 16.

For example, an option is that the measuring device 1, 1b is automatically configured corresponding to its installed position, respectively orientation. In the case of a limit level, measuring device 1b having an oscillatory element 8b, it is important to know the orientation and position of the fork tines of the oscillatory fork serving as oscillatory element 8b, in order that an exact measuring can occur and in order that the ability to function and availability of the measuring device 1, 1b can be correspondingly assured. Furthermore, by ascertaining the exact orientation of the measuring device 1, 1b, a plausibility test of the measured values and of the configuration of the measuring device 1,1b can occur.

The invention claimed is:

1. A measuring device for determining and/or monitoring limit level or fill level of a medium in a container, comprising:
   at least one sensor unit; and
   a measurement transmitter unit, and
   at least an inclination sensor, wherein:
   said at least one inclination sensor is integrated in the measuring device for ascertaining orientation of the measuring device and/or said at least one sensor unit on the container;
   said at least one inclination sensor continually monitors orientation of the measuring device and/or said sensor unit in the form of at least one orientation measured value during operation of the measuring device; and
   said measurement transmitter unit has a memory unit, in which limit values for the orientation measured value are stored, and the measuring device outputs an error report in the case of an ascertained orientation measured value lying outside the range of the limit values.

2. The measuring device as claimed in claim 1, wherein:
   said at least one inclination sensor is embodied in said at least one sensor unit.

3. The measuring device as claimed in claim 1, wherein:
   said at least one inclination sensor is integrated in said measurement transmitter unit.

4. The measuring device as claimed in claim 1, wherein:
   said inclination sensor ascertains orientation of the measuring device and/or said sensor unit in the form of at least one orientation measured value at start-up of the measuring device.

5. The measuring device as claimed in claim 4, wherein:
   a display unit is integrated in said measurement transmitter unit which displays the orientation measured value and/or the error report visually or acoustically for ascertaining the orientation.

6. The measuring device as claimed in claim 4, wherein:
   a communication unit integrated in said measurement transmitter unit and transmits the orientation measured value and/or the error report via a fieldbus to a remote, control station.

7. The measuring device as claimed in claim 1, wherein:
   an automatic orienting apparatus is integrated in the measuring device for performing, based on the orientation measured value, a corresponding change of the orientation of the measuring device on the container.

8. The measuring device as claimed in claim 7, further comprising:
   a drive, which, by means of said orienting apparatus, automatically brings about an installed position of the measuring device and/or said sensor unit.

* * * * *